March 4, 1941. W. O. LYTLE 2,233,622
DECORATIVE GLASS AND METHOD OF PRODUCING THE SAME
Filed April 14, 1938 2 Sheets-Sheet 1

INVENTOR
WILLIAM O. LYTLE
BY Bradley & Bee
ATTORNEYS.

March 4, 1941. W. O. LYTLE 2,233,622
DECORATIVE GLASS AND METHOD OF PRODUCING THE SAME
Filed April 14, 1938  2 Sheets-Sheet 2
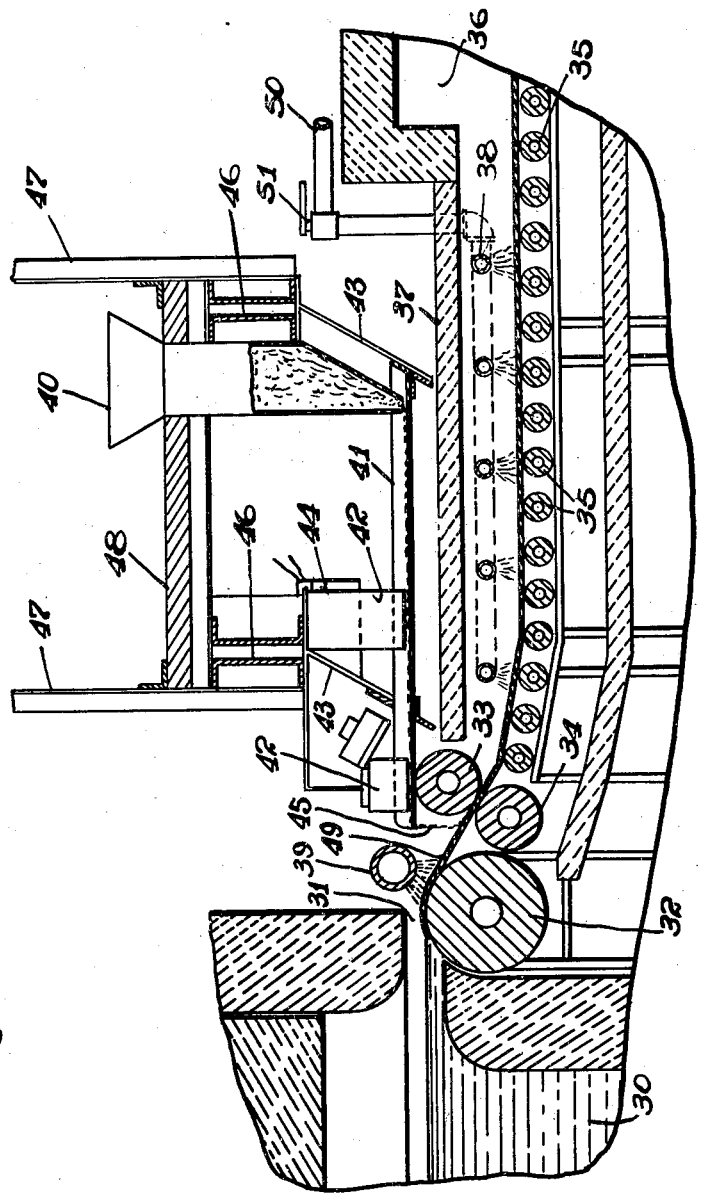
INVENTOR
WILLIAM O. LYTLE
BY Bradley & Bee
ATTORNEYS.

Patented Mar. 4, 1941

2,233,622

UNITED STATES PATENT OFFICE 2,233,622

DECORATIVE GLASS AND METHOD OF PRODUCING THE SAME

William O. Lytle, New Kensington, Pa., assignor to Pittsburgh Plate Glass Company, Allegheny County, Pa., a corporation of Pennsylvania Application April 14, 1938, Serial No. 201,960

8 Claims. (Cl. 49—79)

The present invention relates to decorative glass and more particularly to a process of producing a film or glaze upon the surface of such glass.

The primary object of my invention is to provide a decorative glass having a metallic film integrally bonded to the surface thereof.

Another object of my invention is to provide in a continuous process for the production of glass sheet a process for producing metallic film on said sheet.

A further object of my invention is to provide a process for producing a metallic film on glass while tempering said glass by sudden cooling.

In producing mirrors having silvered surfaces, it has heretofore been the practice to apply a chemical compound to a cold sheet of glass and then reduce or react the compound in a suitable manner to form a metallic film on said glass sheet. Such mirrors, however, have not been entirely satisfactory because the metallic film was not integrally bonded to the surface of the glass sheet and consequently was liable to be removed by mechanical abrasion.

I have made the discovery that metallic films may be integrally bonded to the surface of a glass sheet in a continuous operation for the production of glass sheet by a process which comprises applying a metallic oxide to the red-hot surface of said sheet or to the surface of a molten glass bath from which said sheet is formed and then reducing said oxide by suitable means to form a metallic film on the surface of said glass sheet.

Figure 1:
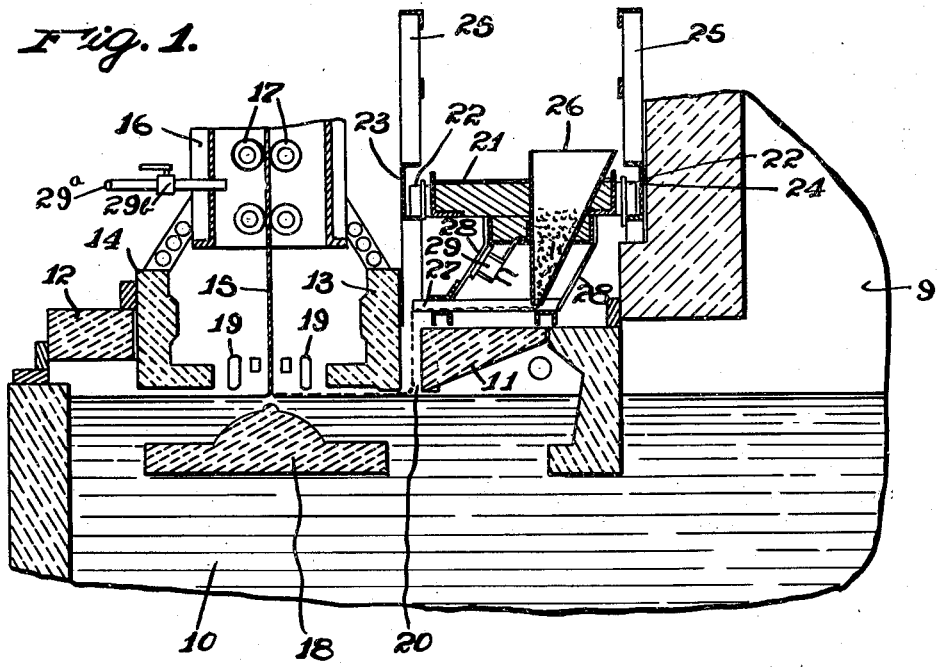
Figure 3:
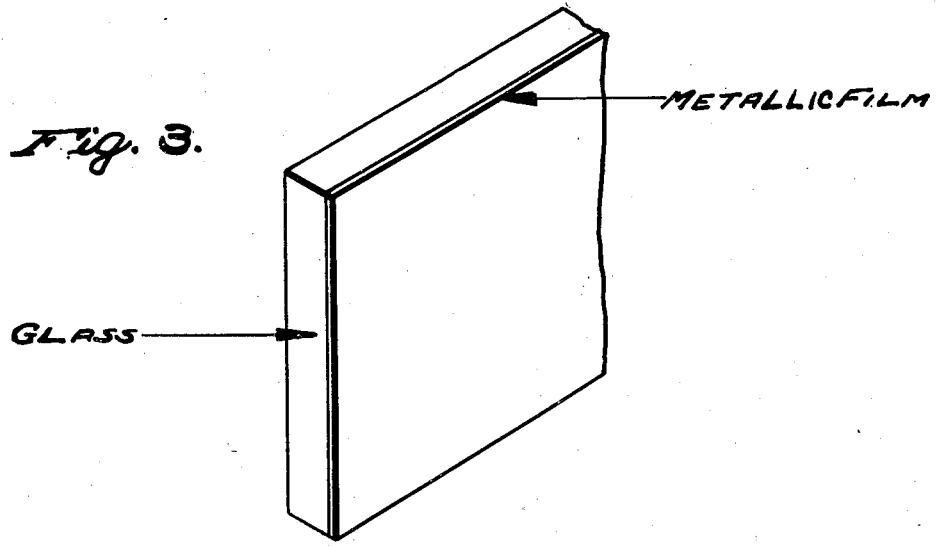

These and other objects and advantages of my invention will be more readily apparent from the following detailed description and the accompanying drawings, wherein:

Figure 1 is a vertical section through a drawing kiln showing one means for producing my invention, and, Figure 2 is a similar view of a rolling machine showing another means for producing my invention, and, Figure 3 is an isometric view showing the product of my invention.

Referring to the apparatus shown in Figure 1, the reference numeral 9 indicates the outlet end of a glass melting tank, and 10 is a forehearth or extension connected to the melting tank. The forehearth is in part covered by the refractory members 11 and 12 and the L-blocks 13 and 14, the latter being separated to provide a space for the drawing of the glass sheet 15. This sheet is drawn up continuously through a Fourcault leer 16 provided with the driven rolls 17 which grip the sides of the sheets. Means for maintaining a circulation of a reducing gas, such as the pipe 29a and valve 29b connected to a source of flue gas are provided in this leer so that the sheet 15, which is red-hot, is in contact with a reducing atmosphere. Beneath the line of draw of the glass sheet is the draw-bar 18 and on either side of the glass sheet are the coolers 19, 19. The structure as thus far described, is well known in the art, with the exception of the means shown for maintaining a circulation of a reducing gas in the leer 16, and is used for the continuous production of window glass.

Located to the rear of the block 13 between such block and the cover member 11 is a slot 20 extending across the width of the forehearth, and in practicing the process to which the present invention relates, a metallic oxide, such as silver oxide, aluminum oxide, or tin oxide is fed continuously onto the molten bath where it floats and is carried forward by the movement of the surface glass until it becomes incorporated as the surface layer of the sheet 15. Contrary to what might be expected, these metallic oxides remain in the surface layer of glass and do not become noticeably dissipated throughout the main body of glass in the forehearth 10, so that after any desired period of production of metallic-film covered glass, the feed of metallic oxide may be discontinued and the production may be shifted to ordinary window glass, or the feed to the bath of another metallic oxide may be substituted. Also, if desired, the metallic oxide may be incorporated in glass frit, in the proportion of about 5% to 15%, by weight. By the use of frit with the oxide, a better distribution of the oxide is obtained and it is more firmly bonded to the glass surface of sheet 15.

Instead of applying the oxide to the surface of the bath, it may be sprayed or dusted on the sheet 15 above the meniscus thereof but before the sheet passes through the rolls 17. In such case, the oxide will be immediately reduced by the reducing gas present in the leer.

Suitable means are illustrated above the cover 11 for giving a uniform measured feed of the metallic oxide or mixture of oxide and frit. This feeder apparatus is carried by a platform 21 provided with wheels 22 running upon the flanges of the channels 23 and 24, such channels being in turn supported upon the upright superstructure members 25. This platform carries a series of hoppers 26, each holding a body of the metallic oxide or mixture of metallic oxide and frit. These hoppers discharge to a plurality of troughs 27 placed side by side, such troughs increasing in width from their rear to their front ends. The troughs are supported upon the strips or plates 28 of spring material, and one of these plates carries an electrically-operated vibrator 29. Under the influence of this vibrator, the metallic oxide or mixture of oxide and frit, discharged into the troughs 27 at the bottoms of the hoppers is fed along the bottoms of such troughs in uniform layers and discharges through the slot 20. Feeders of this kind are well known in other arts, and may be regulated to give any desired volume of feed depending upon the operation of the vibrator and upon the amount of discharge permitted from the hopper to the trough. The discharge from each trough spreads out, as the glass moves forward so that by the time the metallic oxide reaches the meniscus of the sheet 15, the entire area which is drawn into the sheet is covered by the oxide. The thickness of the metallic film formed on the sheet will depend upon the character of the metallic oxide and the quantity which is fed onto the surface of the glass. Means for circulating a reducing gas through the drawing kiln are the pipe 29a, controlled by a suitable valve 29b, the pipe being connected by suitable means to a source of reducing gas, such as a tank of flue gas.

Referring to the apparatus which is shown in Figure 2 of the drawings, the numeral 30 indicates the outlet end of a glass melting tank preferably of the regenerator type, which tank is provided with an outlet slot 31 for directing a layer of glass over a driven water-cooled roller 32. In advance of the roller 32 are a pair of sizing rollers 33 and 34 which are also suitably driven and water cooled. After the reduction of the sheet 49 to proper dimensions between the rolls 33 and 34, it is carried along the roller runway 35 (in which a reducing atmosphere is maintained) and through a horizontal annealing leer 36 (in which a reducing atmosphere is also maintained) in a manner well known in the art. A cover 37 is provided over the runway, and beneath such runway are preferably located a series of gas burners 38. Another burner 39 may also be provided above the roller 32, as indicated in the drawings. These burners may be regulated so that a reducing flame is produced whereby the layer of oxide on sheet 49 will be reduced to form a metallic film, as shown in Figure 3. Also, a reducing gas may be circulated through the apparatus by means of pipe 50 which is regulated by valve 51 thereon, said pipe being suitably connected to a source of supply of a reducing gas, such as flue gas.

Apparatus is shown above the cover 37 for applying to the surface of the glass sheet a metallic film which becomes an integral part thereof. The primary use of the invention is in the application of a metallic oxide or a mixture of frit and oxide. This is ordinarily in the form of a powdered metallic oxide which is supplied from a hopper 40. This oxide may be of various kinds, as previously described, but is ordinarily a finely-divided metallic oxide having a melting point ranging from about 1220° F. to about 2000° F. The oxide after being reduced, as described above, forms a film which constitutes the surface layer of the glass sheet.

From the hopper 40, the metallic oxide, or oxide and frit, is deposited in a horizontal trough 41 whose sides taper outward, so that the layer of material as applied to the sheet is of substantially the same width as the sheet. Spreaders 42, 42 may be applied over the bottom of the trough closely adjacent thereto to insure a uniform distribution of the layer. The trough is mounted upon spring supports 43, 43, so that the trough is readily subject to vibration in a longitudinal direction, and the necessary vibration is secured by the use of an electrical vibrator 44, of any approved type. The vibration of the trough causes the layer of material on the bottom of the trough to move forward at a rate of speed depending upon the degree of vibration, so that a uniform layer is applied at 45 just in advance of the sizing roller 33. The surface of the sheet at this point is at a red-heat ranging from about 1100° F. to about 1500° F., and a red-heat is maintained in the sheet as it passes along the runway and enters the leer. Under these conditions, there is ample heat to melt the oxide into a layer, which after reduction becomes joined to the glass as its surface layer. The apparatus, including the hopper and feeding mechanism, are mounted upon a framework 46 carried by the depending members 47, which members are in turn preferably supported by a crane, so that the apparatus may be readily moved into and out of position. A platform 48 is provided on the framework around the hopper for the workmen who supply the metallic oxide to the hopper from time to time. It will be seen that the production of the machine may be easily shifted from clear glass to metallic-coated glass and then back to clear glass after the requirement for the metal-covered glass is filled, thus permitting great flexibility of operation. Also, that a shift may be made from one oxide to another. If desired, a plurality of feed troughs may be employed instead of a single trough with a supply of a metal oxide of a different color to each trough, so that striped effects may be produced.

Sheet glass which has been tempered by the "Herculiting" process may also be treated to form a metallic film thereon. According to this method, a sheet of glass which has been produced by any of the methods known to the art, may have a coating of metallic oxide applied thereto by any suitable method, such as by spraying or dusting. The sheet of glass is then heated in a suitable furnace to about 1150° F. while a reducing atmosphere is maintained in said furnace by circulating a reducing gas therethrough, such as flue gas containing carbon monoxide. At the elevated temperature in said furnace when the glass reaches the temperature of about 1150° F. the oxide coating on the glass is rapidly reduced thereby forming a metallic film on the surface of the glass. The sheet of glass is then subjected to a sudden cooling operation through the annealing range of temperatures. The cooling may be effected by any desired means, such as by exposing the sheet to blasts of cold air or by immersing it in an oil bath.

The metallic film, formed on glass by the reduction of an oxide coating thereon by any of the above-described methods, provides a sheet which may be used as a mirror or reflecting surface for decorative purposes, or, when formed in a light film, may be used as an X-ray or transparent mirror, or as a heat-repelling or reflecting or heat-absorbing sheet.

The foregoing detailed description has been given for clearness of understanding only and no unnecessary limitations should be understood therefrom, but it should be construed as broadly as permissible in view of the prior art.

What I claim is:

1. A process of making decorative glass having a metallic film upon its surface which comprises applying a layer of metallic oxide upon the red-hot surface of a sheet of glass as it is passed through a horizontal rolling machine, and maintaining a reducing atmosphere in said machine whereby said oxide is reduced and said glass sheet has a metallic film integrally formed thereon.

2. A process as defined in claim 1, in which the oxide is silver oxide.

3. A process as defined in claim 1, in which the oxide is aluminum oxide.

4. A process as defined in claim 1, in which the oxide is tin oxide.

5. A process of making decorative glass having a metallic film upon its surface which comprises applying a layer of metallic oxide upon the red-hot surface of a sheet of glass as it is passed through a horizontal rolling machine, and then passing said sheet under a plurality of burners by which a reducing flame is maintained and exposing the oxide-coated sheet to said reducing flame whereby said oxide is reduced and said sheet has a metallic film integrally formed thereon.

6. A process as defined in claim 5, in which the oxide is silver oxide.

7. A process as defined in claim 5, in which the oxide is aluminum oxide.

8. A process as defined in claim 5, in which the oxide is tin oxide.

WILLIAM O. LYTLE.